(12) United States Patent
Zhang et al.

(10) Patent No.: US 12,505,977 B2
(45) Date of Patent: Dec. 23, 2025

(54) IMAGING METHOD AND APPARATUS FOR DIRECT ELECTRON DETECTION CAMERAS AND COMPUTER DEVICE

(71) Applicant: INSTITUTE OF BIOPHYSICS, CHINESE ACADEMY OF SCIENCES, Beijing (CN)

(72) Inventors: Xinzheng Zhang, Beijing (CN); Dongjie Zhu, Beijing (CN)

(73) Assignee: INSTITUTE OF BIOPHYSICS, CHINESE ACADEMY OF SCIENCES, Beijing (CN)

( * ) Notice: Subject to any disclaimer, the term of this patent is extended or adjusted under 35 U.S.C. 154(b) by 502 days.

(21) Appl. No.: 18/168,313

(22) Filed: Feb. 13, 2023

(65) Prior Publication Data

US 2023/0260743 A1      Aug. 17, 2023

Related U.S. Application Data

(63) Continuation of application No. PCT/CN2022/077799, filed on Feb. 25, 2022.

(30) Foreign Application Priority Data

Mar. 12, 2021      (CN) .......................... 202110271241.X

(51) Int. Cl.
*H01J 37/26* (2006.01)
*H01J 37/22* (2006.01)

(52) U.S. Cl.
CPC .......... *H01J 37/263* (2013.01); *H01J 37/222* (2013.01); *H01J 2237/223* (2013.01); *H01J 2237/226* (2013.01)

(58) Field of Classification Search
None
See application file for complete search history.

(56) References Cited

U.S. PATENT DOCUMENTS

2010/0202672 A1* 8/2010 Sinclair ................... H01J 37/20
                                                                   382/128
2020/0333270 A1* 10/2020 Punjani ................... G06T 17/00

FOREIGN PATENT DOCUMENTS

CN           107092790 A        8/2017
CN           107945114 A   *    4/2018    ....... G06F 18/23213
                           (Continued)

OTHER PUBLICATIONS

English machine translation for CN-107945114-A (Year: 2018).*
English machine translation for CN-112215942-A (Year: 2021).*

*Primary Examiner* — Robert H Kim
*Assistant Examiner* — Alina Kaliszewski
(74) *Attorney, Agent, or Firm* — Nitin Kaushik

(57) ABSTRACT

The present invention discloses an imaging method and an apparatus for direct electron detection cameras and a computer device, and relates to the technical field of electron microscope cameras. The present invention is mainly capable of improving the signal-to-noise ratio (SNR) of an image so as to improve the detective quantum efficiency of electron. The method includes the steps of classifying clusters in an original image to obtain low SNR clusters and high SNR clusters; performing three-dimensional reconstruction by using the images corresponding to the low SNR clusters and the high SNR clusters, respectively, to obtain three-dimensional models corresponding to the low SNR clusters and the high SNR clusters, respectively; performing filtering on the image corresponding to the low SNR clusters by using the filtering function, and superimposing the image to obtain m output image corresponding to the vitrified sample.

14 Claims, 5 Drawing Sheets

(56) References Cited

FOREIGN PATENT DOCUMENTS

| CN | 112215942 A | * | 1/2021 | ............. G06T 17/00 |
| WO | WO2019068201 A1 | | 4/2019 | |
| WO | WO2019190576 A2 | | 10/2019 | |
| WO | WO-2021159006 A1 | * | 8/2021 | ............... G02F 1/15 |

* cited by examiner

IMAGING METHOD AND APPARATUS FOR DIRECT ELECTRON DETECTION CAMERAS AND COMPUTER DEVICE

CROSS-REFERENCE TO RELATED APPLICATIONS

The present invention claims the priority of the Chinese Patent Application Number 202110271241.X, entitled "Imaging Method and Apparatus for Direct Electron Detection Cameras and Computer Device" submitted to the China Patent Office on Mar. 12, 2021, which is hereby incorporated by reference in its entirety.

TECHNICAL FIELD

The present invention relates to the technical field of electron microscope cameras, and in particular to an imaging method and an apparatus for direct electron detection cameras and a computer device.

BACKGROUND ART

In the field of electron microscopes, and in particular in the field of cryo-electron microscopes, the emergent direct electron detection cameras has greatly improved the electron detection speed and the SNR compared with the traditional CCD (charge coupled device) cameras which need photoelectric conversion. A direct electron detection camera directly detects the electrical signal excited by electrons on the MOS tube for imaging by means of a manufactured CMOS device that is resistant to electron radiation damage, and generates original images. It is necessary to reduce the number and size of the original images output by the camera, due to the large number of original images read inside the camera and the limitation of the camera's output capacity, and for the convenience of subsequent processing of the original images.

Presently, in the process of camera output of images, a centroid method is generally used to process the original images. That is, the cluster centroid is calculated by the pixel values and position vectors of all pixels in the clusters of the original images. The images are regenerated and output on the basis of the calculated centroid so as to reduce the size and number of output images. However, in the process of image regeneration, it is considered in the centroid method that the SNRs corresponding to all clusters in the original image are identical. Actually, the SNRs of the clusters in the original image are not identical There may be some clusters with SNR. If these clusters with low SNR are directly used to regenerate an image, there will be more noise in the regenerated image, which will further lead to a lower SNR of the generated image. Especially while detecting electrons of reduced energy, the number of backscattered electrons will increase, and the centroid method will lead to a significant decrease in the SNR of the generated image, which will affect the detective quantum efficiency of electrons. When the generated image is used for three-dimensional reconstruction, the resolution of the three-dimensional model will be low.

SUMMARY OF THE INVENTION

The present invention provides an imaging method and an apparatus for direct electron detection cameras and a computer device, which is mainly capable of improving the SNRs of images so as to improve the detective quantum efficiency of electrons, and improving the resolution of a three-dimensional model when generated images are used to perform three-dimensional reconstruction.

According to a first aspect of the present invention, there is provided an imaging method for direct electron detection cameras, wherein the method comprises the steps of:

acquiring an original image of a vitrified sample taken by a direct electron detection camera;

classifying clusters in the original image to obtain low SNR clusters and high SNR clusters, and generating images corresponding to the low SNR clusters and the high SNR clusters, respectively;

performing three-dimensional reconstruction by utilizing the images corresponding to the low SNR clusters and the high SNR clusters, respectively to obtain three-dimensional models corresponding to the low SNR clusters and the high SNR clusters, respectively;

calculating a filtering function corresponding to the low SNR clusters on the basis of the three-dimensional models corresponding to the low SNR clusters and the high SNR clusters, respectively; and performing filtering on the image corresponding to the low SNR clusters by using the filtering function, and superposing the filtered image corresponding to the low SNR clusters and the image corresponding to the high SNR clusters to obtain an output image corresponding to the vitrified sample.

According to a second aspect of the present invention, there is provided an imaging apparatus for direct electron detection cameras, comprising:

an acquisition unit configured to acquire an original image of a vitrified sample taken by a direct electron detection camera;

a classification unit configured to classify clusters in the original image to obtain low SNR clusters and high SNR clusters, and generate images corresponding to the low SNR clusters and the high SNR clusters, respectively;

a reconstruction unit configured to perform three-dimensional reconstruction by utilizing the images corresponding to the low SNR clusters and the high SNR clusters, respectively to obtain three-dimensional models corresponding to the low SNR clusters and the high SNR clusters, respectively;

a calculation unit configured to calculate a filtering function corresponding to the low SNR clusters on the basis of the three-dimensional models corresponding to the low SNR clusters and the high SNR clusters, respectively; and a filtering unit configured to perform filtering on the image corresponding to the low SNR clusters by using the filtering function, and superposing the filtered image corresponding to the low SNR clusters and the image corresponding to the high SNR clusters to obtain an output image corresponding to the vitrified sample.

According to a third aspect of the present invention, there is provided a computer-readable storage medium having a computer program stored thereon, and when the computer program is executed by the processor to implement the steps of:

acquiring an original image of a vitrified sample taken by a direct electron detection camera;

classifying clusters in the original image to obtain low SNR clusters and high SNR clusters, and generating images corresponding to the low SNR clusters and the high SNR clusters, respectively;

performing three-dimensional reconstruction by utilizing the images corresponding to the low SNR clusters and the high SNR clusters, respectively to obtain three-dimensional models corresponding to the low SNR clusters and the high SNR clusters, respectively;

calculating a filtering function corresponding to the low SNR clusters on the basis of the three-dimensional models corresponding to the low SNR clusters and the high SNR clusters, respectively; and performing filtering on the image corresponding to the low SNR clusters by using the filtering function, and superposing the filtered image corresponding to the low SNR clusters and the image corresponding to the high SNR clusters to obtain an output image corresponding to the vitrified sample.

According to a fourth aspect of the present invention, there is provided a computer device, comprising a memory, a processor and a computer program stored on the memory and operable on the processor, and the computer program is executed by the processor to implement the steps of:

acquiring an original image of a vitrified sample taken by a direct electron detection camera;

classifying clusters in the original image to obtain low SNR clusters and high SNR clusters, and generating images corresponding to the low SNR clusters and the high SNR clusters, respectively;

performing three-dimensional reconstruction by utilizing the images corresponding to the low SNR clusters and the high SNR clusters, respectively to obtain three-dimensional models corresponding to the low SNR clusters and the high SNR clusters, respectively;

calculating a filtering function corresponding to the low SNR clusters on the basis of the three-dimensional models corresponding to the low SNR clusters and the high SNR clusters, respectively; and performing filtering on the image corresponding to the low SNR clusters by using the filtering function, and superposing the filtered image corresponding to the low SNR clusters and the image corresponding to the high SNR clusters to obtain an output image corresponding to the vitrified sample.

The present invention provides an imaging method and an apparatus for direct electron detection cameras and a computer device. Compared with the mode of the centroid method currently used in the processing and outputting of original images, the present invention is capable of acquiring an original image of a vitrified sample taken by a direct electron detection camera, classifying the clusters in the original image to obtain low SNR clusters and high SNR clusters, and generating images corresponding to the low SNR clusters and the high SNR clusters, respectively; at the same time, performing three-dimensional reconstruction by utilizing the images corresponding to the low SNR clusters and the high SNR clusters, respectively to obtain three-dimensional models corresponding to the low SNR clusters and the high SNR clusters, respectively, and calculating the filtering function corresponding to the low SNR clusters on the basis of three-dimensional models corresponding to the low SNR clusters and the high SNR clusters, respectively; finally, performing filtering on the image corresponding to the low SNR clusters by using the filtering function, and superimposing the filtered image corresponding to the low SNR clusters and the image corresponding to the high SNR clusters to obtain an output image corresponding to the vitrified sample. In this way, the filtering function can be calculated by separating clusters in the original image into low SNR clusters and high SNR clusters and according to the SNRs corresponding to the low SNR clusters and the high SNR clusters, respectively. The filtering function is then used to filter the image corresponding to the low SNR clusters so that the SNR of the image generated by superimposing of the filtered image is ensured to reach the maximum SNR. Therefore, the decrease in the SNR of the image and the reduction of detective quantum efficiency of electron can be avoided when the voltage changes, and the resolution of the model obtained by three-dimensional reconstruction of the generated image can be higher.

BRIEF DESCRIPTION OF THE DRAWINGS

The drawings described herein provide a further understanding of the present invention and form a part of the present invention. The illustrative embodiments of the present invention and the description thereof explain the present invention, and do not constitute undue restrictions on the present invention. In the accompanying drawings.

DETAILED DESCRIPTION OF PREFERRED EMBODIMENTS

The present invention will be described in detail below with reference to the drawings and in conjunction with embodiments. It should be noted that the embodiments in the present invention and the features in the embodiments may be combined with each other without conflicts.

Presently, in the process of re-imaging, it is considered in the centroid method that the SNRs corresponding to all clusters in the original image are identical. But in fact, there may be some clusters with a low SNR. If these clusters with a low SNR are directly used to regenerate an image, there will be more noise in the regenerated image, which will further lead to a low SNR of the generated image. Especially in the process of voltage reduction, the number of backscattered electrons will increase, and the centroid method will lead to a significant decrease in the SNR of the generated image, which will affect the efficiency of electron detection. When the generated image is used for three-dimensional reconstruction, the resolution of the three-dimensional model will be low.

Figure 1:
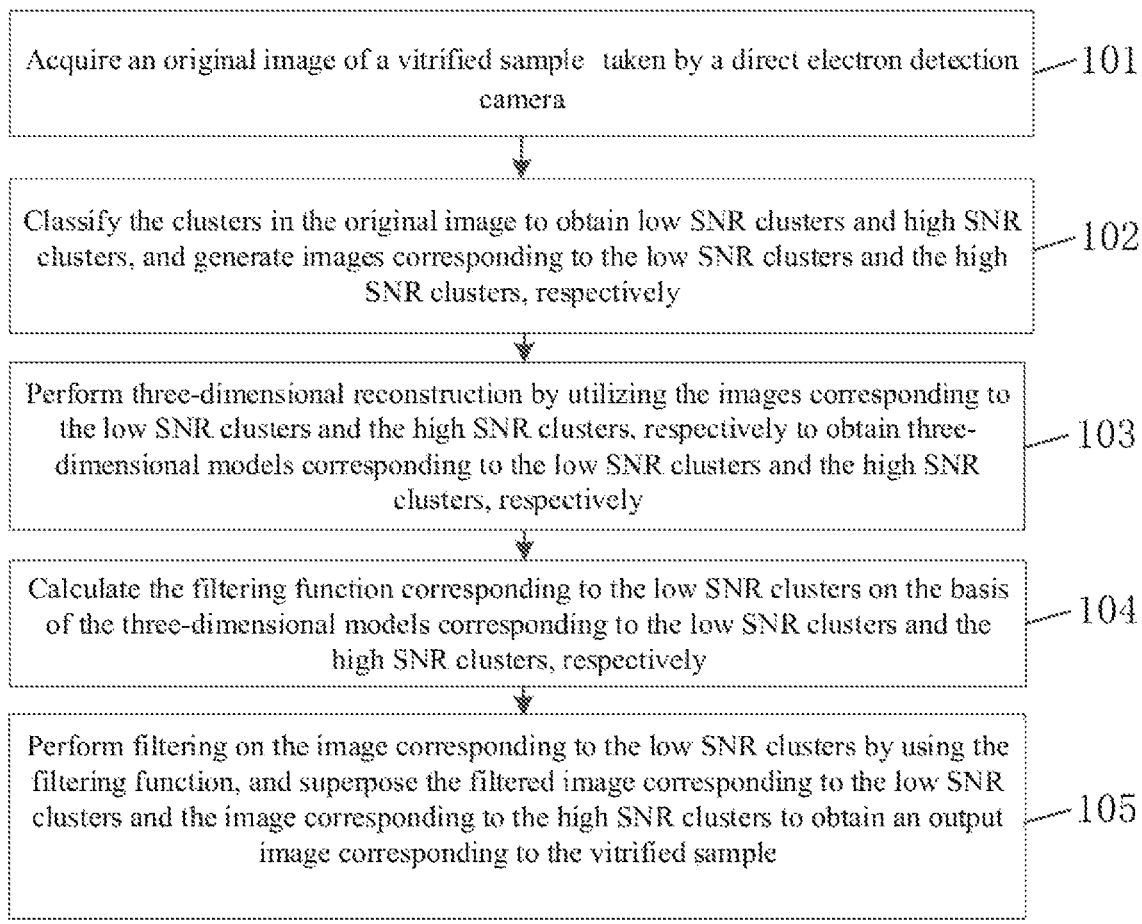
FIG. 1 shows a flowchart depicting an imaging method for direct electron detection cameras according to an embodiment of the present invention.

To solve the above problem, the embodiment of the present invention provides an imaging method for direct electron detection cameras, as shown in FIG. 1. The method includes the following steps:

101. Acquire an original image of a vitrified sample taken by a direct electron detection camera.

The original image is a two-dimensional image frame corresponding to the vitrified sample, and the original image is stored in a unit of frame. The embodiments of the invention are mainly applied to the imaging scene of electron detection cameras. The executive body of the embodiments of the invention is an imaging apparatus or device for direct electron detection cameras, which can be specifically disposed on a client side or a server side.

According to an embodiment of the invention, when a direct electron detection camera photographs a vitrified sample, large numbers of original images can be quickly captured inside the camera, and the large numbers of original images are stored in the unit of frame. Due to the limitation of camera output capability and for the convenience of subsequent processing of original images, it is necessary to process the original images so as to reduce the number thereof and also the size thereof. In processing the original images, the centroid method in the prior art neither distinguishes nor performs filtering on the low SNR clusters in the original images, leading to a reduced SNR of the generated images or the output images of the camera, thereby affecting the detective quantum efficiency of electron. In the embodiments of the invention, the low SNR clusters and the high SNR clusters in the original images are identified, and the filtering function is calculated by using the SNRs corresponding to the low SNR clusters and the high SNR clusters, respectively, so that the SNR of the image generated by the superposition of filtered images can be maximized, thus improving the detective quantum efficiency of electron.

102. Classify the clusters in the original image to obtain low SNR clusters and high SNR clusters, and generate images corresponding to the low SNR clusters and the high SNR clusters, respectively.

According to the embodiments of the invention, after obtaining an original image corresponding to a vitrified sample, it is necessary to determine the cluster set contained in the original image, where the clusters are pixels excited by single electrons. Specifically, the cluster set contained in an original image may be determined by using a preset Gauss-Laplace convolution algorithm, and the clusters contained in the cluster set are divided. Further, the area, total excitation value or peak value corresponding to each cluster in the original image are determined so that the clusters in the original image are divided into high SNR clusters and low SNR clusters according to the corresponding area, total excitation value or peak value of each cluster, Finally, two-dimensional images corresponding to the high SNR clusters and the low SNR clusters are generated by, but not limited to the centroid method. In the centroid calculation process of any one of the high SNR clusters and the low SNR clusters, specifically, the pixel values are multiplied by the position vectors corresponding to the pixel points in the clusters, and the multiplication result is then divided by the sum of all pixel values in the clusters to obtain the centroids corresponding to the high SNR clusters and the low SNR clusters, respectively, and two-dimensional images corresponding to the high SNR clusters and the low SNR clusters respectively are generated on the basis of the calculated centroids, so that three-dimensional reconstruction can be performed on the basis of the generated two-dimensional images to obtain the three-dimensional models corresponding to the low SNR clusters and the high SNR clusters, respectively.

103. Perform three-dimensional reconstruction by utilizing the images corresponding to the low SNR clusters and the high SNR clusters, respectively to obtain three-dimensional models corresponding to the low SNR clusters and the high SNR clusters, respectively.

According to the embodiments of the invention, after the two-dimensional images corresponding to the low SNR clusters and the high SNR clusters respectively are obtained, three-dimensional reconstruction of the two-dimensional images is performed by a preset three-dimensional reconstruction software to obtain the three-dimensional models corresponding to the low SNR clusters and the high SNR clusters, respectively, where the preset three-dimensional reconstruction software can be RELION software.

104. Calculate the filtering function corresponding to the low SNR clusters on the basis of the three-dimensional models corresponding to the low SNR clusters and the high SNR clusters, respectively.

According to the embodiments of the invention, after the three-dimensional models corresponding to the low SNR clusters and the high SNR clusters, respectively, are obtained by using the preset three-dimensional reconstruction software, the Fourier shell correlation coefficient corresponding to the high SNR clusters is calculated by using the three-dimensional model corresponding to the high SNR clusters. On the basis of the Fourier shell correlation coefficient corresponding to the high SNR clusters, the SNR corresponding to the high SNR clusters is calculated. Similarly, the Fourier shell correlation coefficient corresponding to the low SNR clusters is calculated by using the three-dimensional model corresponding to the low SNR clusters. On the basis of the Fourier shell correlation coefficient corresponding to the low SNR clusters, the SNR corresponding to the high SNR clusters is calculated. Further, by using the SNR corresponding to the low SNR clusters and the SNR corresponding to the high SNR clusters, the filtering function is calculated so that after the image is processed by the filtering function, the SNR of the image generated by superposition can be improved, and the SNR of the image generated by superposition can be ensured to be maximized, thereby avoiding the effect of voltage changes on the detective quantum efficiency of electron.

105. Perform filtering on the image corresponding to the low SNR clusters by using the filtering function, and superpose the filtered image corresponding to the low SNR clusters and the image corresponding to the high SNR clusters to obtain an output image corresponding to the vitrified sample.

According to the embodiments of the invention, in order to improve the SNR corresponding to the low SNR clusters, it is necessary to filter the image corresponding to the low SNR clusters in the Fourier space by using the calculated filtering function, and perform inverse Fourier transform. After that, the pixel value of the filtered image of the low SNR clusters is added with the pixel value of the image corresponding to the high SNR clusters to obtain the output image of the vitrified sample, thereby ensuring that the SNR of the camera output image reaches the maximum value. Compared with the centroid method of the prior art, the SNR of the image has a significant improvement, and at the same time, the reduction of detective quantum efficiency of electron can be avoided when the voltage changes.

The present invention provides an imaging method for direct electron detection cameras. Compared with the mode of the centroid method currently used in the processing and outputting of original images, the present invention is capable of acquiring an original image of a vitrified sample taken by a direct electron detection camera, classifying the clusters in the original image to obtain low SNR clusters and high SNR clusters, and generating images corresponding to the low SNR clusters and the high SNR clusters, respectively; at the same time, performing three-dimensional reconstruction by utilizing the images corresponding to the low SNR clusters and the high SNR clusters, respectively to obtain three-dimensional models corresponding to the low SNR clusters and the high SNR clusters, respectively, and calculating the filtering function corresponding to the low SNR clusters on the basis of three-dimensional models corresponding to the low SNR clusters and the high SNR clusters, respectively; finally, performing filtering on the image corresponding to the low SNR clusters by using the filtering function, and superimposing the filtered image corresponding to the low SNR clusters and the image corresponding to the high SNR clusters to obtain an output image corresponding to the vitrified sample. In this way, the filtering function can be calculated by separating clusters in the original image into low SNR clusters and high SNR clusters and according to the SNRs corresponding to the low SNR clusters and the high SNR clusters, respectively. The filtering function is then used to filter the image corresponding to the low SNR clusters so that the SNR of the image generated by superimposing of the filtered image is ensured to reach the maximum value, and therefore, the decrease in the SNR of the image and the detective quantum efficiency of electron can be avoided when the voltage changes, and the resolution of the model obtained by three-dimensional reconstruction of the generated image can be higher.

Figure 2:
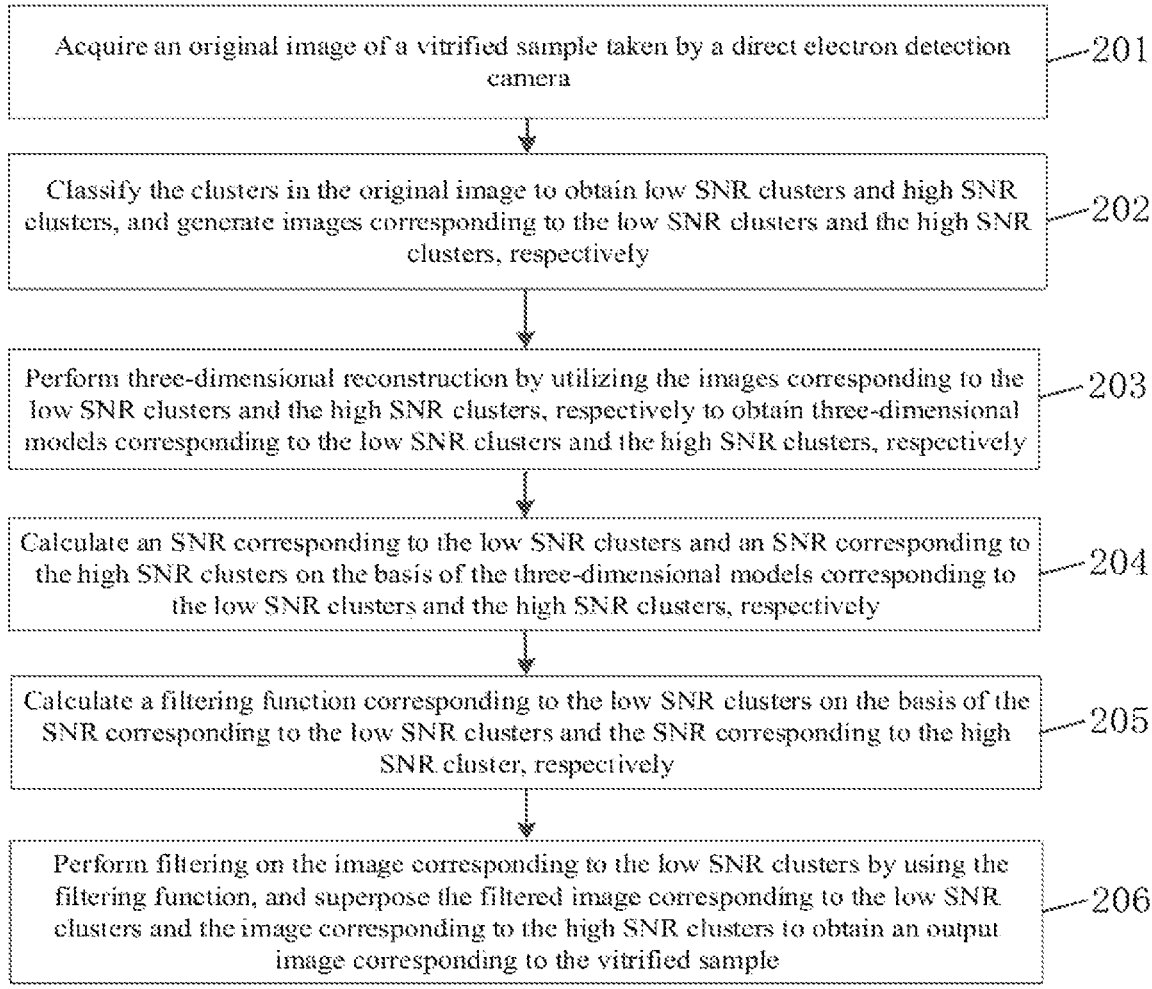
FIG. 2 shows a flowchart depicting another imaging method for direct electron detection cameras according to an embodiment of the present invention.

Furthermore, in order to better explain the above process of image filtering, as a refinement and extension of the above embodiment, the embodiment of the present invention provides another imaging method for direct electron detection cameras, and as shown in FIG. 2. The method includes the following steps:

201. Acquire an original image of a vitrified sample taken by a direct electron detection camera.

According to the embodiments of the invention, when a direct electron detection camera photographs a vitrified sample, a large number of original images can be quickly captured inside the camera. The large number of original images are stored in the unit of frame.

202. Classify the clusters in the original image to obtain low SNR clusters and high SNR clusters, and generate images corresponding to the low SNR clusters and the high SNR clusters, respectively.

According to the embodiments of the present invention, in order to identify the clusters contained in the original image and classify the clusters. Step 202 specifically includes the steps of determining a cluster set in the original image by utilizing a preset Gauss-Laplace convolution algorithm, and separating clusters contained in the cluster set; determining attribute information corresponding to the clusters, where the attribute information includes at least one of areas, total excitation values and peak values corresponding to the clusters; and classifying the clusters on the basis of the attribute information to obtain the low SNR clusters and the high SNR clusters: Further, the step of determining a cluster set in the original image by utilizing a preset Gauss-Laplace convolution algorithm, and separating clusters contained in the cluster set includes the steps of: assigning a value of 0 to each pixel point less than or equal to a first preset pixel value in the original image, and generating a first image corresponding to the original image; convolving each pixel point in the first image with a Gauss-Laplace convolution kernel to obtain a second image corresponding to the original image; assigning a value of 0 to each pixel point less than or equal to a second preset pixel value in the second image, and assigning a value of 1 to each pixel point greater than the second preset pixel value in the second image to obtain a third image corresponding to the original image; and multiplying the pixel value in the third image by the pixel value in the original image to obtain the cluster set of the original image. The first preset pixel value and the second preset pixel value can be empirically set, and by setting the first preset pixel value and the second preset pixel value, the change in the number of clusters can be leveled off.

Specifically, in order to determine the cluster set contained in the original image, the pixel value corresponding to each pixel point in the original image is compared with the first preset pixel value. If the pixel value corresponding to a certain pixel point is greater than or equal to the second preset pixel value, the pixel value corresponding to the pixel point is set to 0, and the pixel values of other pixels remain unchanged. In this way, the first image corresponding to the original image can be generated. Furthers each pixel point in the first image is convolved with a Gauss-Laplace convolution kernel to obtain the second image corresponding to the original image, where the Gauss-Laplace convolution kernel is as shown in Table 1:

TABLE 1

| 0 | 0 | −1 | 0 | 0 |
|---|---|---|---|---|
| 0 | −1 | −2 | −1 | 0 |
| −1 | −2 | 16 | −2 | −1 |
| 0 | −1 | −2 | −1 | 0 |
| 0 | 0 | −1 | 0 | 0 |

Further, the pixel value corresponding to each pixel point in the second image is compared with the second preset pixel value. If the pixel value corresponding to a pixel point is less than or equal to the second preset pixel value, the pixel value corresponding to the pixel point is set as 0. If the pixel value corresponding to a pixel point is greater than the second preset pixel value, the pixel value corresponding to the pixel point is set as 1, so that the third image corresponding to the original image can be obtained. Finally, the pixel value in the generated third image is multiplied by the pixel value in the original image to obtain the cluster set contained in the original image.

Furthers after determining the cluster set, it is necessary to separate the clusters in the cluster set. On this basis, the step of separating the clusters contained in the cluster set includes the steps of taking a pixel point with a pixel value equal to 1 in the third image as a starting point, and adding the starting point to a search point set; searching and checking whether there is a pixel point with a pixel value of 1 among the nearest 4 or 8 pixel points around the starting point; if there is a pixel point with a pixel value of 1 in the nearest 4 or 8 pixel points, adding this pixel point with a pixel value of 1 as a search point to the search point set and determining same as a cluster, and searching with this search point as a new starting point until there is no pixel point with a pixel value of 1 that has not been searched. Compared with the prior art, the method for separating clusters in the embodiment of the invention can effectively separate these clusters and has higher recognition efficiency for single clusters when a plurality of clusters is close to each other.

According to the embodiments of the invention, because the SNRs of the clusters in an original image are different, after separating the clusters contained in the original image, it is necessary to classify these clusters, i.e., to distinguish low SNR clusters from high SNR clusters. Specifically, the area, total excitation value or peak value corresponding to a cluster can be determined, and the clusters can be divided into high SNR clusters and low SNR clusters by using the area, total excitation value or peak value corresponding to the clusters. For example, clusters with an area greater than 4 are set as low SNR clusters and clusters with an area less than or equal to 4 are set as high SNR clusters. According to statistics, the cluster A contains two pixel points, i.e., the cluster A corresponds to an area of 2. Therefore, it can be determined that the cluster A is a high SNR cluster. For another example, clusters with a total excitation value greater than 1250 are set as low SNR clusters, and clusters with a total excitation value less than or equal to 1250 are set as high SNR clusters. According to statistics, it is determined that the sum of pixel values corresponding to the pixel points contained in the cluster B is 2000. Thus, it can be determined that the cluster B is a low SNR cluster. For still another example, clusters with a peak value greater than 550 are set as low SNR clusters, and clusters with a peak value less than or equal to 550 are set as high SNR clusters. The maximum pixel value of the pixel points contained in the cluster C is statistically determined to be 500. Thus, the cluster C can be determined as a high SNR cluster. In this way, clusters can be divided into high SNR clusters and SNR clusters by using the corresponding areas, total excitation values or peak values of clusters.

Further, after low SNR and high SNR clusters are obtained, if a direct electron detection camera is compatible with the EER format, the centroid method may be used to determine the pixel point vector information corresponding to the low SNR clusters and the pixel point vector information corresponding to the high SNR clusters. Specifically, according to the centroid method, the pixel point vector information corresponding to the low SNR clusters and the pixel point vector information corresponding to the high SNR clusters are obtained on the basis of the pixel values and position information corresponding to the pixel points. If a direct electron detection camera is not compatible with the EER format, an image corresponding to the low SNR clusters and a picture corresponding to the high SNR clusters can be generated by the normalization method. Specifically, the normalization method is used to calculate the sum of excitation values of a plurality of pixel points in a cluster, divide each pixel value in the cluster by the sum of excitation values and record such in the output image.

203. Perform three-dimensional reconstruction by utilizing the images corresponding to the low SNR clusters and the high SNR clusters, respectively to obtain three-dimensional models corresponding to the low SNR clusters and the high SNR clusters, respectively.

According to the embodiments of the present invention, in order to construct three-dimensional models corresponding to the low SNR clusters and the high SNR clusters, step 203 specifically includes the steps of performing single particle analysis on the original image to obtain spatial orientation and translation information of particles in the original image; and performing three-dimensional reconstruction on the basis of the spatial orientation, the translation information and the images corresponding to the low SNR clusters and the high SNR clusters, respectively to obtain three-dimensional models corresponding to the low SNR clusters and the high SNR clusters, respectively. Further, the step of performing three-dimensional reconstruction on the basis of the spatial orientation, the translation information and the images corresponding to the low SNR clusters and the high SNR clusters, respectively to obtain three-dimensional models corresponding to the low SNR clusters and the high SNR clusters, respectively includes: performing random odd-even classification on the images corresponding to the low SNR clusters and the high SNR clusters, respectively to obtain odd groups of images and even groups of images corresponding to the low SNR clusters and the high SNR clusters, respectively; and performing three-dimensional reconstruction, on the basis of the spatial orientation, the translation information, on the odd groups of images and the even groups of images corresponding to the low SNR clusters and the high SNR clusters, respectively to obtain odd three-dimensional models and even three-dimensional models corresponding to the low SNR clusters and the high SNR clusters, respectively.

Specifically, in the process of three-dimensional reconstruction of two-dimensional images corresponding to the low SNR clusters and the high SNR clusters, it is also necessary to obtain the spatial orientation and translation information of the particles in the original image. Specifically, single particle analysis may be performed on the original image to obtain the spatial orientation and translation information corresponding to the protein molecules in the original image so as to use the spatial orientation and translation information to perform three-dimensional reconstruction on the two-dimensional images to obtain three-dimensional models corresponding to the low SNR clusters and the high SNR clusters respectively. In the process of constructing the three-dimensional models, it is necessary to construct odd three-dimensional models and even three-dimensional models corresponding to the low SNR clusters and the high SNR clusters, respectively. Specifically, two-dimensional images corresponding to the low SNR clusters are randomly grouped to obtain an odd group of images and an even group of images corresponding to the low SNR clusters. Similarly, two-dimensional images corresponding to the high SNR clusters are randomly grouped to obtain an odd group of images and an even group of images corresponding to the high SNR clusters. Further, on the basis of the spatial orientation and the translation information of the protein molecules, three-dimensional reconstruction is performed on the odd group of images and the even group of images corresponding to the low SNR clusters to obtain an odd three-dimensional model and an even three-dimensional model corresponding to the low SNR clusters. Similarly, on the basis of the spatial orientation and the translation information of the protein molecules, three-dimensional reconstruction is performed on the odd group of images and the even group of images corresponding to the high SNR clusters to obtain an odd three-dimensional model and an even three-dimensional model corresponding to the high SNR clusters so as to calculate the Fourier shell correlation coefficients of the low SNR clusters and the high SNR clusters by using odd three-dimensional models and even three-dimensional models corresponding to the low SNR clusters and the high SNR clusters, respectively.

204. Calculate the SNR corresponding to the low SNR clusters and the SNR corresponding to the high SNR clusters on the basis of the three-dimensional models corresponding to the low SNR clusters and the high SNR clusters, respectively.

According to the embodiments of the present invention, in order to calculate the SNR corresponding to the low SNR clusters and the SNR corresponding to the high SNR clusters, the step 204 specifically includes the steps of calculating a Fourier shell correlation coefficient corresponding to the low SNR clusters and a Fourier shell correlation coefficient corresponding to the high SNR clusters on the basis of the three-dimensional models corresponding to the low SNR clusters and the three-dimensional models corresponding to the high SNR clusters respectively; and calculating the SNR corresponding to the low SNR clusters and the SNR corresponding to the high SNR clusters on the basis of the Fourier shell correlation coefficient corresponding to the low SNR clusters and the Fourier shell correlation coefficient corresponding to the high SNR clusters. Further, the step of calculating a Fourier shell correlation coefficient corresponding to the low SNR clusters and a Fourier shell correlation coefficient corresponding to the high SNR clusters on the basis of the three-dimensional models corresponding to the low SNR clusters and the three-dimensional models corresponding to the high SNR clusters, respectively includes the steps of calculating a Fourier shell correlation coefficient corresponding to the low SNR clusters and a Fourier shell correlation coefficient corresponding to the high SNR clusters, respectively on the basis of the odd three-dimensional models and the even three-dimensional models corresponding to the low SNR clusters and the high SNR clusters, respectively. The specific calculation formula for the Fourier Shell correlation coefficient is as follows:

$$FSC(\omega) = \frac{\sum_k F_O(k, \omega) \cdot F_E^*(k, \omega)}{\sqrt{\sum_k |F_O(k, \omega)|^2 \cdot \sum_k |F_E(k, \omega)|^2}}$$

where FSC represents Fourier Shell correlation coefficient; K represents all pixels belonging to a certain frequency $\omega$ in the Fourier space; and $F_O$ and $F_E$ are Fourier transform of odd and even three-dimensional models, respectively, with the superscript asterisk representing complex conjugation. In this way, according to the above formula, a Fourier shell correlation coefficient corresponding to the low SNR clusters and a Fourier shell correlation coefficient corresponding to the high SNR clusters respectively can be obtained.

Further, on the basis of the calculated Fourier shell correlation coefficient corresponding to the low SNR clusters and Fourier shell correlation coefficient corresponding to the high SNR clusters, respectively, the SNR corresponding to the low SNR clusters and the SNR corresponding to the high SNR clusters are calculated. The specific SNR calculation formula is as follows:

$$SNR(\omega) = \frac{2 \cdot FSC(\omega)}{1 - FSC(\omega)}$$

where FSC represents the Fourier shell correlation coefficients corresponding to the low SNR clusters and high SNR clusters, respectively; and $\omega$ is a certain frequency in the Fourier space.

205. Calculate a filtering function corresponding to the low SNR clusters on the basis of the SNR corresponding to the low SNR clusters and the SNR corresponding to the high SNR cluster, respectively.

According to the embodiments of the present invention, after determining the SNR corresponding to the low SNR clusters and the SNR corresponding to the high SNR clusters by using the above formula, the filter function corresponding to the low SNR clusters is calculated on the basis of the SNRs, so that the two-dimensional image corresponding to the low SNR clusters can be filtered by using the filter function to improve the SNR of the low SNR clusters image. The specific derivation process of the filtering function is as follows:

$$SNR = \left(\frac{S_1 + wS_2}{N_1 + wN_2}\right)^2 \sim \frac{(S_1 + wS_2)^2}{N_1^2 + w^2 N_2^2}$$

where $S_1$ and $S_2$ are image signals corresponding to the low SNR clusters and the high SNR clusters, respectively; and $N_1$ and $N_2$ are image noises corresponding to the low SNR clusters and the high SNR clusters, respectively. By using $$\frac{\partial SNR}{\partial w} = 0$$

we get $$w = \frac{S_2 N_1^2}{S_1 N_2^2} = \sqrt{\frac{SNR_2}{SNR_1}} \cdot \frac{N_1}{N_2}.$$

By simplifying the formula, we get $$w = \sqrt{\frac{SNR_1}{SNR_2} \cdot \frac{NPS_2}{NPS_1}},$$

where $SNR_1$ and $SNR_2$ represent the SNRs corresponding to the low SNR clusters and the high SNR clusters, respectively; and $NPS_1$ and $NPS_2$ represent the noise power spectra corresponding to the low SNR clusters and the high SNR clusters, respectively. With respect to the acquisition process of the noise power spectra, specifically, electrons are directly irradiated on the camera, and the images corresponding to the low SNR clusters and the high SNR clusters are obtained after imaging on the camera. After that, the images corresponding to the low SNR clusters and the high SNR clusters are respectively subjected to Fourier transform. Then, the amplitude is squared to obtain the noise power spectra corresponding to the low SNR clusters and the high SNR clusters, respectively. It can be known from the above derivation process that the filtering function obtained by this formula can ensure that the SNR of the image generated by superimposing the filtered image of the low SNR clusters and the image of the high SNR clusters can be maximized.

In a specific application scenario, the filtering function may be calculated in advance and stored in the storage unit of a camera. When the camera is shooting, the filtering function in the storage unit may be called to filter the captured original image to obtain an output image, thus ensuring that the SNR of the camera output image reaches the maximum value.

206. Perform filtering on the image corresponding to the low SNR clusters by using the filtering function, and superpose the filtered image corresponding to the low SNR clusters and the image corresponding to the high SNR clusters to obtain an output image corresponding to the vitrified sample.

According to the embodiments of the invention, in order to improve the SNR corresponding to the low SNR clusters, it is necessary to filter the image corresponding to the low SNR clusters in the Fourier space by using the calculated filtering function and perform inversed Fourier transformation. After that, the pixel value of the filtered image of the low SNR clusters is added with the pixel value of the image corresponding to the high SNR clusters to obtain an output image of the vitrified sample, thereby ensuring that the SNR of the camera output image reaches the maximum. Compared with the centroid method of the prior art, the SNR of the image is significantly improved, and at the same time, the reduction of detective quantum efficiency of electron when voltage changes can be avoided.

The present invention provides another imaging method for direct electron detection cameras. Compared with the mode of the centroid method currently used in the processing and outputting of original images, the present invention is capable of acquiring an original image of a vitrified sample taken by a direct electron detection camera, classifying the clusters in the original image to obtain low SNR clusters and high SNR clusters, and generating images corresponding to the low SNR clusters and the high SNR clusters, respectively; at the same time, performing three-dimensional reconstruction by utilizing the images corresponding to the low SNR clusters and the high SNR clusters, respectively to obtain three-dimensional models corresponding to the low SNR clusters and the high SNR clusters, respectively, and calculating the filtering function corresponding to the low SNR clusters on the basis of three-dimensional models corresponding to the low SNR clusters and the high SNR clusters, respectively; finally, performing filtering on the image corresponding to the low SNR clusters by using the filtering function, and superimposing the filtered image corresponding to the low SNR clusters and the image corresponding to the high SNR clusters to obtain an output image corresponding to the vitrified sample. In this way, the filtering function can be calculated by dividing clusters in the original image into low SNR clusters and high SNR clusters and according to the SNRs corresponding to the low SNR clusters and the high SNR clusters, respectively. The filtering function is then used to filter the image corresponding to the low SNR clusters so that the SNR of the image generated by superimposing of the filtered image is ensured to reach the maximum value. Therefore, the decrease in the SNR of the image and the detective quantum efficiency of electron can be avoided when the voltage changes, and the resolution of the model obtained by three-dimensional reconstruction of the generated image can be higher.

Figure 3:
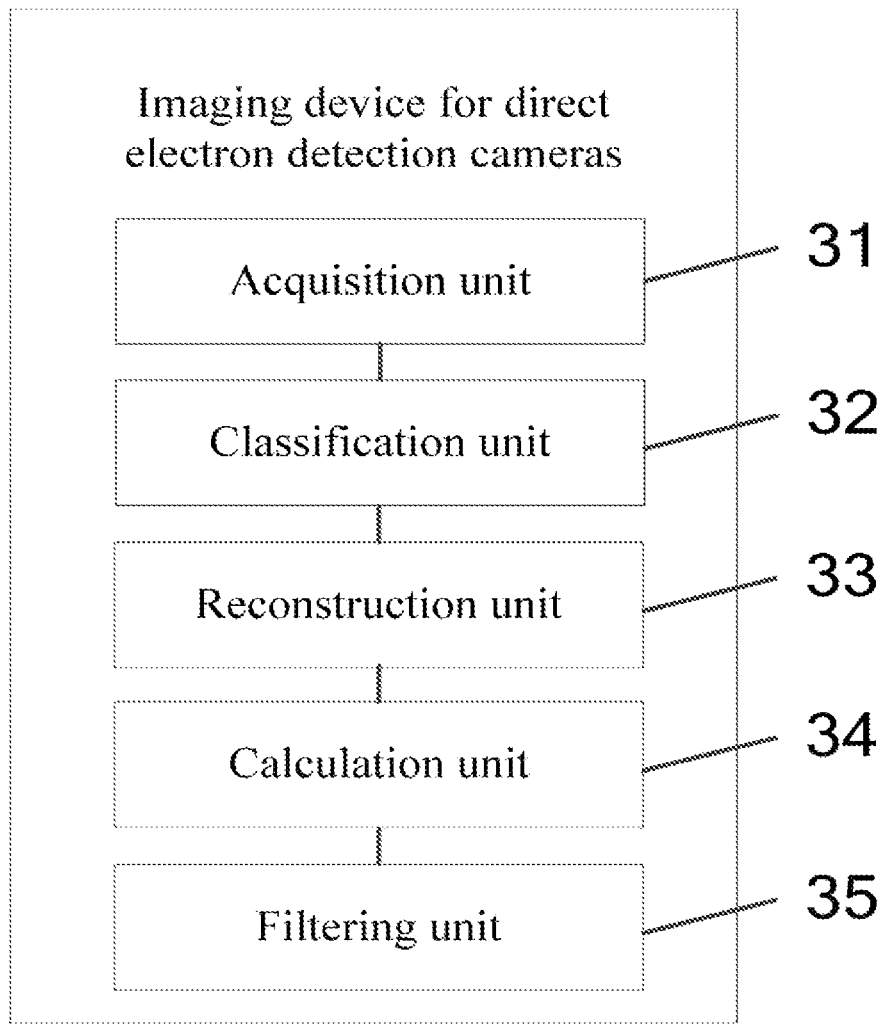
FIG. 3 shows a structural diagram of an imaging device for direct electron detection cameras according to an embodiment of the present invention.

Further, as a specific implementation of FIG. 1, the embodiments of the present invention provide an imaging apparatus for direct electron detection cameras. As shown in FIG. 3, the apparatus includes an acquisition unit 31, a classification unit 32, a reconstruction unit 33, a calculation unit 34 and a filtering unit 35.

The acquisition unit 31 is configured to acquire an original image of a vitrified sample taken by a direct electron detection camera.

The classification unit 32 is configured to classify clusters in the original image to obtain low SNR clusters and high SNR clusters, and generate images corresponding to the low SNR clusters and the high SNR clusters, respectively.

The reconstruction unit 33 is configured to perform three-dimensional reconstruction by utilizing the images corresponding to the low SNR clusters and the high SNR clusters, respectively to obtain three-dimensional models corresponding to the low SNR clusters and the high SNR clusters, respectively.

The calculation unit 34 is configured to calculate the filtering function corresponding to the low SNR clusters on the basis of the three-dimensional models corresponding to the low SNR clusters and the high SNR clusters, respectively.

The filtering unit 35 is configured to perform filtering on the image corresponding to the low SNR clusters by using the filtering function, and superpose the filtered image corresponding to the low SNR clusters and the image corresponding to the high SNR clusters to obtain an output image corresponding to the vitrified sample.

Figure 4:
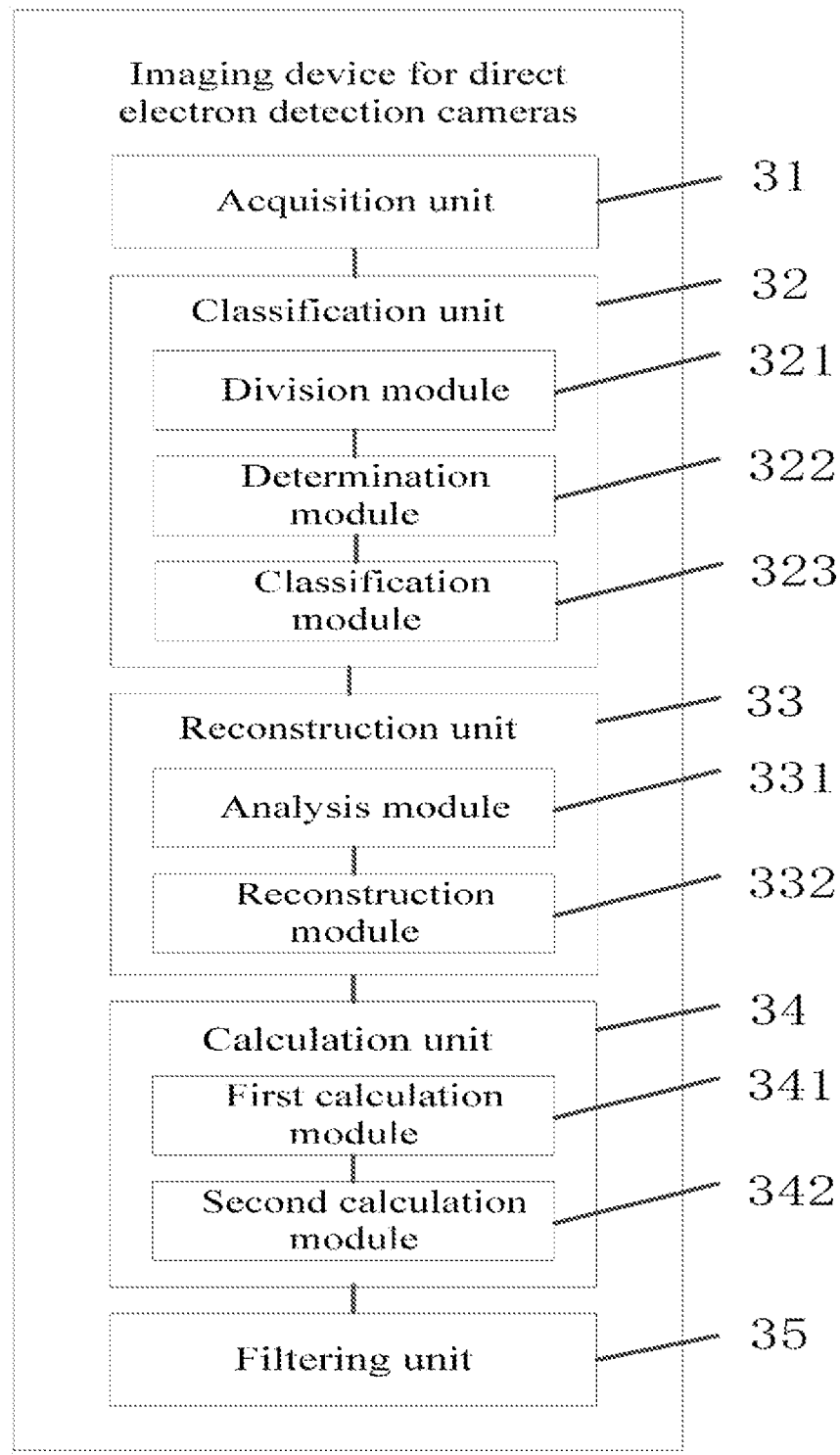
FIG. 4 shows a structural diagram of another imaging device of direct electron detection cameras according to an embodiment of the present invention.

According to an embodiment of the present invention, as shown in FIG. 4, in order to calculate the filtering function corresponding to the low SNR clusters, the calculation unit 34 includes a first calculation module 341 and a second calculation module 342.

The first calculation module 341 is configured to calculate an SNR corresponding to the low SNR clusters and an SNR corresponding to the high SNR clusters on the basis of the three-dimensional models corresponding to the low SNR clusters and the high SNR clusters, respectively.

The second calculation module 342 is configured to calculate the filtering function corresponding to the low SNR clusters on the basis of the three-dimensional models corresponding to the low SNR clusters and the high SNR clusters, respectively.

In a specific application scenario, the first calculation module 341 includes a first calculation sub-module and a second calculation sub-module.

The first calculation sub-module is configured to calculate a Fourier shell correlation, coefficient corresponding to the low SNR clusters and a Fourier shell correlation coefficient corresponding to the high SNR clusters, respectively on the basis of the three-dimensional models corresponding to the low SNR clusters and the high SNR clusters, respectively.

The second calculation sub-module is configured to calculate the SNR corresponding to the low SNR dusters and the SNR corresponding to the high SNR clusters on the basis of the Fourier shell correlation coefficient corresponding to the low SNR clusters and the Fourier shell correlation coefficient corresponding to the high SNR clusters.

Further, in order to obtain three-dimensional models corresponding to the low SNR dusters and the high SNR clusters, respectively, the reconstruction unit 33 includes an analysis module 331 and a reconstruction module 332.

The analysis module 331 is configured to perform single particle analysis on the original image to obtain spatial orientation and translation information of particles in the original image.

The reconstruction module 332 is configured to perform three-dimensional reconstruction on the basis of the spatial orientation, the translation information and the images corresponding to the low SNR clusters and the high SNR clusters, respectively to obtain three-dimensional models corresponding to the low SNR clusters and the high SNR clusters, respectively.

In a specific application scenario, in order to obtain three-dimensional models corresponding to the low SNR clusters and the high SNR clusters, respectively, the reconstruction module 332 includes a classification sub-module and a reconstruction sub-module.

The classification sub-module is configured to perform odd-even classification on the images corresponding to the low SNR clusters and the high SNR clusters respectively to obtain odd groups of images and even groups of images corresponding to the low SNR clusters and the high SNR clusters, respectively.

The reconstruction sub-module is configured to perform three-dimensional reconstruction, on the basis of the spatial orientation and the translation information, on the odd groups of images and the even groups of images corresponding to the low SNR clusters and the high SNR clusters, respectively to obtain odd three-dimensional models and even three-dimensional models corresponding to the low SNR clusters and the high SNR clusters, respectively.

The first calculation sub-module is configured to calculate a Fourier shell correlation coefficient corresponding to the low SNR clusters and a Fourier shell correlation coefficient corresponding to the high SNR clusters, respectively on the basis of the odd three-dimensional models and the even three-dimensional models corresponding to the low SNR clusters and the high SNR clusters, respectively.

In a specific application scenario, in order to classify clusters in the original image, the classification unit 32 includes a division module 321, a determination module 322 and a classification module 323.

The division module 321 is configured to determine the cluster set in the original image by utilizing a preset Gauss-Laplace convolution algorithm, and separating clusters contained in the cluster set.

The determination module 322 is configured to determine attribute information corresponding to the clusters, where the attribute information comprises at least one of areas, total excitation values and peak values corresponding to the clusters.

The classification module 323 is configured to classify the clusters on the basis of the attribute information to obtain the low SNR clusters and the high SNR clusters:

Further, in order to determine the cluster set contained in the original image, the determination module 322 includes a generation sub-module and a multiplication sub-module.

The generation sub-module is configured to assign a value of 0 to each pixel point less than or equal to a first preset pixel value in the original image, and generate a first image corresponding to the original image.

The multiplication sub-module is configured to convolve each pixel point in the first image with a Gauss-Laplace convolution kernel to obtain a second image corresponding to the original image.

The generation sub-module is configured also to assign a value of 0 to each pixel point less than or equal to a second preset pixel value in the second image, and assign a value of 1 to each pixel point greater than the second preset pixel value in the second image to obtain a third image corresponding to the original image.

The multiplication sub-module is configured also to multiply the pixel value in the third image by the pixel value in the original image to obtain the cluster set of the original image.

It should be noted that other corresponding descriptions of the functional modules involved in the imaging apparatus for direct electron detection cameras provided by the embodiment of the present invention may refer to the corresponding descriptions of the method shown in FIG. 1, and will not be repeated here.

On the basis of the above method as shown in FIG. 1, correspondingly, the embodiment of the present invention also provides a computer readable storage medium having a computer program stored thereon, which when executed by a processor implements the steps of acquiring an original image of a vitrified sample taken by a direct electron detection camera; classifying clusters in the original image to obtain low SNR clusters and high SNR clusters, and generating images corresponding to the low SNR clusters and the high SNR clusters respectively; performing three-dimensional reconstruction by utilizing the images corresponding to the low SNR clusters and the high SNR clusters, respectively to obtain three-dimensional models corresponding to the low SNR clusters and the high SNR clusters, respectively; calculating a filtering function corresponding to the low SNR clusters on the basis of the three-dimensional models corresponding to the low SNR clusters and the high SNR clusters respectively; performing filtering on the image corresponding to the low SNR clusters by using the filtering function, and superposing the filtered image corresponding to the low SNR clusters and the image corresponding to the high SNR clusters to obtain an output image corresponding to the vitrified sample.

Figure 5:
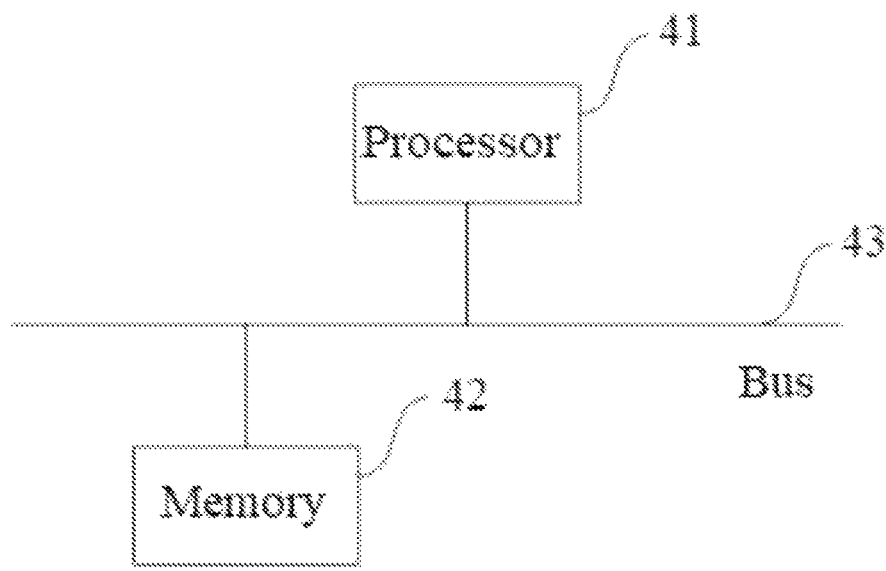
FIG. 5 shows an entity structural diagram of an imaging device according to an embodiment of the present invention.

On the basis of the method shown in FIG. 1 and an embodiment of the apparatus shown in FIG. 3, the embodiment of the present invention also provides a physical structural diagram of a computer device, as shown in FIG. 5, and the computer device includes a processor 41, a memory 42, and a computer program stored in the memory 42 and executable on the processor, where the memory 42 and the processor 41 are both arranged on a bus 43. The processor 41 executes the program to implement the steps of acquiring an original image of a vitrified sample taken by a direct electron detection camera; classifying clusters in the original image to obtain low SNR clusters and high SNR clusters, and generating images corresponding to the low SNR clusters and the high SNR clusters respectively; performing three-dimensional reconstruction by utilizing the images corresponding to the low SNR clusters and the high SNR clusters, respectively to obtain three-dimensional models corresponding to the low SNR clusters and the high SNR clusters, respectively; calculating a filtering function corresponding to the low SNR clusters on the basis of the three-dimensional models corresponding to the low SNR clusters and the high SNR clusters, respectively; performing filtering on the image corresponding to the low SNR clusters by using the filtering function, and superposing the filtered image corresponding to the low SNR clusters and the image corresponding to the high SNR clusters to obtain an output image corresponding to the vitrified sample.

The technical solution of the present invention enables the present invention to be capable of acquiring an original image of a vitrified sample taken by a direct electron detection camera; classifying the clusters in the original image to obtain low SNR clusters and high SNR clusters, and generating images corresponding to the low SNR clusters and the high SNR clusters, respectively at the same time, performing three-dimensional reconstruction by utilizing the images corresponding to the low SNR clusters and the high SNR clusters, respectively to obtain three-dimensional models corresponding to the low SNR clusters and the high SNR clusters respectively and calculating the filtering function corresponding to the low SNR clusters on the basis of three-dimensional models corresponding to the low SNR clusters and the high SNR clusters, respectively; finally, performing filtering on the image corresponding to the low SNR clusters by using the filtering function, and superimposing the filtered image corresponding to the low SNR clusters and the image corresponding to the high SNR clusters to obtain an output image corresponding to the vitrified sample. In this way, the filtering function can be calculated by separating clusters in the original image into low SNR clusters and high SNR clusters and according to the SNRs corresponding to the low SNR clusters and the high SNR clusters respectively. The filtering function is then used to filter the image corresponding to the low SNR clusters so that the SNR of the image generated by superimposing of the filtered image is ensured to reach the maximum value. Therefore, the decrease in the SNR of the image and the detective quantum efficiency of electron can be avoided when the voltage changes, and the resolution of the model obtained by three-dimensional reconstruction of the generated image can be higher.

Obviously, it should be understood by those skilled in the art that each module or each step of the present invention may be implemented by a general computing device. They may be concentrated on a single computing device, or distributed on a network composed of a plurality of computing devices. Alternatively, they may be implemented via program code executable by a computing device, and thus, they may be stored in a storage device for execution by the computing device. In some cases, the steps shown or described may be performed in an order different from that described herein, or they may be separately fabricated into individual integrated circuit modules, or a plurality of modules or steps among them may be fabricated into a single integrated circuit module. Thus, the present invention is not limited to any particular combination of hardware and software.

The foregoing is merely preferred embodiments of the invention and is not intended to limit the invention. For those skilled in the art, the present invention may be subject to various modifications and variations. Any modification, equivalent substitution, improvement, etc. made within the spirit and principle of the present invention shall be included in the scope of protection of the present invention.

What is claimed is:

1. An imaging method for direct electron detection cameras, comprising the steps of:
    acquiring an original image of a vitrified sample taken by a direct electron detection camera;
    classifying clusters in the original image to obtain low signal noise ratio (SNR) clusters and high SNR clusters, and generating images corresponding to the low SNR clusters and the high SNR clusters, respectively;
    performing three-dimensional reconstruction by utilizing the images corresponding to the low SNR clusters and the high SNR clusters, respectively to obtain three-dimensional models corresponding to the low SNR clusters and the high SNR clusters, respectively;
    calculating a filtering function corresponding to the low SNR clusters on the basis of the three-dimensional models corresponding to the low SNR clusters and the high SNR clusters, respectively; and
    performing filtering on the image corresponding to the low SNR clusters by using the filtering function, and superposing the filtered image corresponding to the low SNR clusters and the image corresponding to the high SNR clusters to obtain an output image corresponding to the vitrified sample.

2. The method according to claim 1, wherein the step of calculating a filtering function corresponding to the low SNR clusters on the basis of the three-dimensional models corresponding to the low SNR clusters and the high SNR clusters, respectively, comprising the steps of:
    calculating an SNR corresponding to the low SNR clusters and an SNR corresponding to the high SNR clusters on the basis of the three-dimensional models corresponding to the low SNR clusters and the high SNR clusters, respectively; and
    calculating a filtering function corresponding to the low SNR clusters on the basis of the SNR corresponding to the low SNR clusters and the SNR corresponding to the high SNR cluster, respectively.

3. The method according to claim 2, wherein the step of calculating an SNR corresponding to the low SNR clusters and an SNR corresponding to the high SNR clusters on the basis of the three-dimensional models corresponding to the low SNR clusters and the high SNR clusters, respectively, comprising the steps of:
    calculating a Fourier shell correlation coefficient corresponding to the low SNR clusters and a Fourier shell correlation coefficient corresponding to the high SNR clusters on the basis of the three-dimensional models corresponding to the low SNR clusters and the high SNR clusters, respectively; and
    calculating an SNR corresponding to the low SNR clusters and an SNR corresponding to the high SNR clusters on the basis of the Fourier shell correlation coefficient corresponding to the low SNR clusters and the Fourier shell correlation coefficient corresponding to the high SNR clusters.

4. The method according to claim 3, wherein the step of performing three-dimensional reconstruction by utilizing the images corresponding to the low SNR clusters and the high SNR clusters, respectively to obtain three-dimensional models corresponding to the low SNR clusters and the high SNR clusters, respectively, comprising the steps of:
    performing single particle analysis on the original image to obtain spatial orientation and translation information of particles in the original image; and
    performing three-dimensional reconstruction on the basis of the spatial orientation, the translation information and the images corresponding to the low SNR clusters and the high SNR clusters, respectively to obtain three-dimensional models corresponding to the low SNR clusters and the high SNR clusters, respectively.

5. The method according to claim 4, wherein the step of performing three-dimensional reconstruction on the basis of the spatial orientation, the translation information and the images corresponding to the low SNR clusters and the high SNR clusters, respectively to obtain three-dimensional models corresponding to the low SNR clusters and the high SNR clusters, respectively, comprising the steps of:
    performing odd-even classification on the images corresponding to the low SNR clusters and the high SNR clusters, respectively to obtain odd groups of images and even groups of images corresponding to the low SNR clusters and the high SNR clusters, respectively; and
    performing three-dimensional reconstruction, on the basis of the spatial orientation and the translation information, on the odd groups of images and the even groups of images corresponding to the low SNR clusters and the high SNR clusters, respectively to obtain odd three-dimensional models and even three-dimensional models corresponding to the low SNR clusters and the high SNR clusters, respectively;
    the step of calculating a Fourier shell correlation coefficient corresponding to the low SNR clusters and a Fourier shell correlation coefficient corresponding to the high SNR clusters on the basis of the three-dimensional models corresponding to the low SNR clusters and the high SNR clusters, respectively comprises the step of:
    calculating a Fourier shell correlation coefficient corresponding to the low SNR clusters and a Fourier shell correlation coefficient corresponding to the high SNR clusters, respectively on the basis of the odd three-dimensional models and the even three-dimensional models corresponding to the low SNR clusters and the high SNR clusters, respectively.

6. The method according to claim 1, wherein the step of classifying clusters in the original image to obtain low SNR clusters and high SNR clusters comprises the steps of:

determining a cluster set in the original image by utilizing a preset Gauss-Laplace convolution algorithm, and separating clusters contained in the cluster set;

determining attribute information corresponding to the clusters, wherein the attribute information comprises at least one of an area, a total excitation value and a peak value corresponding to the clusters; and classifying the clusters on the basis of the attribute information to obtain the low SNR clusters and the high SNR clusters.

7. The method according to claim 6, wherein the step of determining a cluster set in the original image by utilizing a preset Gauss-Laplace convolution algorithm, and separating clusters contained in the cluster set comprises the steps of:

assigning a value of 0 to each pixel point less than or equal to a first preset pixel value in the original image, and generating a first image corresponding to the original image;

convolving each pixel point in the first image with a Gauss-Laplace convolution kernel to obtain a second image corresponding to the original image;

assigning a value of 0 to each pixel point less than or equal to a second preset pixel value in the second image, and assigning a value of 1 to each pixel point greater than the second preset pixel value in the second image to obtain a third image corresponding to the original image; and multiplying a pixel value in the third image by a pixel value in the original image to obtain the cluster set of the original image.

8. An imaging apparatus for direct electron detection cameras, comprising:

an acquisition unit configured to acquire an original image of a vitrified sample taken by a direct electron detection camera;

a classification unit configured to classify clusters in the original image to obtain low SNR clusters and high SNR clusters, and generate images corresponding to the low SNR clusters and the high SNR clusters, respectively;

a reconstruction unit configured to perform three-dimensional reconstruction by utilizing the images corresponding to the low SNR clusters and the high SNR clusters, respectively to obtain three-dimensional models corresponding to the low SNR clusters and the high SNR clusters, respectively;

a calculation unit configured to calculate a filtering function corresponding to the low SNR clusters on the basis of the three-dimensional models corresponding to the low SNR clusters and the high SNR clusters, respectively; and a filtering unit configured to perform filtering on the image corresponding to the low SNR clusters by using the filtering function, and superposing the filtered image corresponding to the low SNR clusters and the image corresponding to the high SNR clusters to obtain an output image corresponding to the vitrified sample.

9. A computer readable storage medium, on which a computer readable instruction is stored, wherein the computer readable instruction is executed by a processor to achieve a direct electron detection camera imaging method, comprising:

acquiring an original image of a vitrified sample taken by a direct electron detection camera;

classifying clusters in the original image to obtain low SNR clusters and high SNR clusters, and generating images corresponding to the low SNR clusters and the high SNR clusters, respectively;

performing three-dimensional reconstruction by utilizing the images corresponding to the low SNR clusters and the high SNR clusters, respectively to obtain three-dimensional models corresponding to the low SNR clusters and the high SNR clusters, respectively;

calculating a filtering function corresponding to the low SNR clusters on the basis of the three-dimensional models corresponding to the low SNR clusters and the high SNR clusters, respectively; and performing filtering on the image corresponding to the low SNR clusters by using the filtering function, and superposing the filtered image corresponding to the low SNR clusters and the image corresponding to the high SNR clusters to obtain an output image corresponding to the vitrified sample.

10. The computer readable storage medium according to claim 9, wherein the computer-readable instructions are executed by the processor to implement the step of calculating a filtering function corresponding to the low SNR clusters on the basis of the three-dimensional models corresponding to the low SNR clusters and the high SNR clusters, respectively, comprising the steps of:

calculating an SNR corresponding to the low SNR clusters and an SNR corresponding to the high SNR clusters on the basis of the three-dimensional models corresponding to the low SNR clusters and the high SNR clusters, respectively; and calculating a filtering function corresponding to the low SNR clusters on the basis of the SNR corresponding to the low SNR clusters and the SNR corresponding to the high SNR cluster, respectively.

11. The computer readable storage medium according to claim 10, wherein the computer-readable instructions are executed by the processor to implement the step of calculating an SNR corresponding to the low SNR clusters and an SNR corresponding to the high SNR clusters on the basis of the three-dimensional models corresponding to the low SNR clusters and the high SNR clusters, respectively, comprising the steps of:

calculating a Fourier shell correlation coefficient corresponding to the low SNR clusters and a Fourier shell correlation coefficient corresponding to the high SNR clusters on the basis of the three-dimensional models corresponding to the low SNR clusters and the high SNR clusters, respectively; and calculating an SNR corresponding to the low SNR clusters and an SNR corresponding to the high SNR clusters on the basis of the Fourier shell correlation coefficient corresponding to the low SNR clusters and the Fourier shell correlation coefficient corresponding to the high SNR clusters.

12. The computer readable storage medium according to claim 11, wherein the computer-readable instructions are executed by the processor to implement the step of performing three-dimensional reconstruction by utilizing the images corresponding to the low SNR clusters and the high SNR clusters, respectively to obtain three-dimensional models corresponding to the low SNR clusters and the high SNR clusters, respectively, comprising the steps of:

performing single particle analysis on the original image to obtain spatial orientation and translation information of particles in the original image; and performing three-dimensional reconstruction on the basis of the spatial orientation, the translation information and the images corresponding to the low SNR clusters and the high SNR clusters, respectively to obtain three-dimensional models corresponding to the low SNR clusters and the high SNR clusters, respectively.

13. The computer readable storage medium according to claim 12, wherein the computer-readable instructions are executed by the processor to implement the step of performing three-dimensional reconstruction on the basis of the spatial orientation, the translation information and the images corresponding to the low SNR clusters and the high SNR clusters, respectively to obtain three-dimensional models corresponding to the low SNR clusters and the high SNR clusters, respectively, comprising the steps of:

performing odd-even classification on the images corresponding to the low SNR clusters and the high SNR clusters, respectively to obtain odd groups of images and even groups of images corresponding to the low SNR clusters and the high SNR clusters, respectively; and performing three-dimensional reconstruction, on the basis of the spatial orientation and the translation information, on the odd groups of images and the even groups of images corresponding to the low SNR clusters and the high SNR clusters, respectively to obtain odd three-dimensional models and even three-dimensional models corresponding to the low SNR clusters and the high SNR clusters, respectively;

the step of calculating a Fourier shell correlation coefficient corresponding to the low SNR clusters and a Fourier shell correlation coefficient corresponding to the high SNR clusters, respectively on the basis of the three-dimensional models corresponding to the low SNR clusters and the high SNR clusters, respectively comprises the step of:

calculating a Fourier shell correlation coefficient corresponding to the low SNR clusters and a Fourier shell correlation coefficient corresponding to the high SNR clusters, respectively on the basis of the odd three-dimensional models and the even three-dimensional models corresponding to the low SNR clusters and the high SNR clusters, respectively.

14. The computer readable storage medium according to claim 9, wherein the computer-readable instructions are executed by the processor to implement the step of classifying clusters in the original image to obtain low SNR clusters and high SNR clusters, comprising the steps of:

determining a cluster set in the original image by utilizing a preset Gauss-Laplace convolution algorithm, and separating clusters contained in the cluster set;

determining attribute information corresponding to the clusters, wherein the attribute information comprises at least one of an area, a total excitation value and a peak value corresponding to the clusters; and classifying the clusters on the basis of the attribute information to obtain the low SNR clusters and the high SNR clusters.

* * * * *